(12) United States Patent
Kawamae et al.

(10) Patent No.: US 11,956,415 B2
(45) Date of Patent: *Apr. 9, 2024

(54) HEAD MOUNTED DISPLAY APPARATUS

(71) Applicant: MAXELL, LTD., Kyoto (JP)

(72) Inventors: Osamu Kawamae, Kyoto (JP); Kenichi Shimada, Tokyo (JP); Manabu Katsuki, Kyoto (JP); Megumi Kurachi, Kyoto (JP)

(73) Assignee: MAXELL, LTD., Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/150,431

(22) Filed: Jan. 5, 2023

(65) Prior Publication Data

US 2023/0156176 A1 May 18, 2023

Related U.S. Application Data

(63) Continuation of application No. 17/299,114, filed as application No. PCT/JP2018/044569 on Dec. 4, 2018, now Pat. No. 11,582,441.

(51) Int. Cl.
*H04N 13/344* (2018.01)
*G02B 27/01* (2006.01)
(Continued)

(52) U.S. Cl.
CPC ....... *H04N 13/344* (2018.05); *G02B 27/0172* (2013.01); *G06T 19/006* (2013.01);
(Continued)

(58) Field of Classification Search
CPC .... G02B 2027/0129; G02B 2027/0134; G02B 2027/0138; G02B 27/0172; G06T 19/00;
(Continued)

(56) References Cited

U.S. PATENT DOCUMENTS 6,045,229 A 4/2000 Tachi et al.
6,084,557 A * 7/2000 Ishida .................... G09G 3/002
345/9
(Continued)

FOREIGN PATENT DOCUMENTS

JP 10-112831 A 4/1998
JP 10-327433 A 12/1998
(Continued)

OTHER PUBLICATIONS

U.S. PTO Office Action issued in related parent U.S. Appl. No. 17/299,114 dated Aug. 2, 2022.
(Continued)

*Primary Examiner* — Dmitriy Bolotin
(74) *Attorney, Agent, or Firm* — Rimon P.C.

(57) ABSTRACT

The occlusion is faithfully expressed even in the binocular vision in the AR display by a head mounted display apparatus or the like. A head mounted display apparatus 10 includes a lens, a lens, a camera, a camera, and a control processor. A CG image for a right eye is displayed on the lens. A CG image for a left eye is displayed on the lens. The camera captures an image for the right eye. The camera captures an image for the left eye. The control processor generates the CG image for the right eye in which occlusion at the time of seeing by the right eye is expressed and the CG image for the left eye in which occlusion at the time of seeing by the left eye is expressed, based on the images captured by the cameras and projects the generated CG image for the right eye and CG image for the left eye onto the lenses and. A center of a lens of the camera is provided at the same position as a center of the lens. A center of a lens of the camera is provided at the same position as a center of the lens.

5 Claims, 5 Drawing Sheets

(51) Int. Cl.
*G06T 19/00* (2011.01)
*H04N 13/239* (2018.01)
*H04N 13/279* (2018.01)

(52) U.S. Cl.
CPC ......... *H04N 13/239* (2018.05); *H04N 13/279* (2018.05); *G02B 2027/0129* (2013.01); *G02B 2027/0134* (2013.01); *G02B 2027/0138* (2013.01)

(58) Field of Classification Search
CPC .. G06T 19/006; H04N 13/239; H04N 13/279; H04N 13/344
See application file for complete search history.

(56) References Cited

U.S. PATENT DOCUMENTS

| | | | |
|---|---|---|---|
| 9,563,982 B2 | 2/2017 | Kanemaru et al. | |
| 10,306,217 B2* | 5/2019 | Sato | H04N 13/398 |
| 10,623,628 B2* | 4/2020 | Hanover | H04N 23/62 |
| 11,582,441 B2* | 2/2023 | Kawamae | H04N 13/344 |
| 2006/0170652 A1 | 8/2006 | Bannai et al. | |
| 2012/0206452 A1 | 8/2012 | Geisner et al. | |
| 2013/0011045 A1* | 1/2013 | Lee | G06T 3/40 |
| | | | 382/154 |
| 2013/0141419 A1 | 6/2013 | Mount et al. | |
| 2014/0184496 A1* | 7/2014 | Gribetz | G06F 3/013 |
| | | | 345/156 |
| 2014/0333665 A1* | 11/2014 | Sylvan | G02B 7/12 |
| | | | 345/633 |
| 2015/0156481 A1* | 6/2015 | Varga | H04N 13/398 |
| | | | 348/47 |
| 2015/0356785 A1* | 12/2015 | Takemoto | G06T 7/194 |
| | | | 345/633 |
| 2018/0275410 A1 | 9/2018 | Yeoh et al. | |
| 2020/0368616 A1* | 11/2020 | Delamont | G06F 3/011 |

FOREIGN PATENT DOCUMENTS

| | | |
|---|---|---|
| JP | 2006-209664 A | 8/2006 |
| JP | 2015-158862 A | 9/2015 |
| JP | 2015-230695 A | 12/2015 |
| JP | 2018-173789 A | 11/2018 |

OTHER PUBLICATIONS

U.S. PTO Notice of Allowance issued in related parent U.S. Appl. No. 17/299,114 dated Oct. 27, 2022.
Office Action dated Aug. 2, 2022 in U.S. Appl. No. 17/299,114.
Notice of Allowance dated Oct. 27, 2022 in U.S. Appl. No. 17/299,114.
International Search Report issued in corresponding International Patent Application No. PCT/JP2018/044569, dated Feb. 26, 2019, with English translation.
Notice of Reasons for Refusal dated Nov. 14, 2023 issued in the corresponding Japanese Patent Application No. 2022-151752, with English machine translation.

* cited by examiner

HEAD MOUNTED DISPLAY APPARATUS

CROSS REFERENCE TO RELATED APPLICATIONS

This application is a Continuation of U.S. patent application Ser. No. 17/299,114, filed Jun. 2, 2021, which is the U.S. National Phase under 35 U.S.C. § 371 of International Application No. PCT/JP2018/044569, filed on Dec. 4, 2018, the entire contents are hereby incorporated by reference.

TECHNICAL FIELD

The present invention relates to a head mounted display apparatus, and particularly relates to a technology effective for expressing the faithful occlusion in the AR (Augmented Reality) display.

BACKGROUND ART

In recent years, various services using AR have been proposed. The AR is a technology for displaying an image created by a computer, a portable computer, or the like so as to be superimposed on an entire screen or a part of a real image.

In a three-dimensional space, there is a front-back relationship in addition to an up-down relationship and a left-right relationship. Therefore, a state in which an object on the far side is hidden behind an object on the near side to be invisible, that is, the occlusion occurs.

In the AR display, in order to provide the user with an AR image that does not give a sense of discomfort, it is important to faithfully express the above-mentioned occlusion by processing a three-dimensional video or the like.

As an AR image processing technology that takes this kind of occlusion into consideration, for example, a technology in which a CG (Computer Graphics) image region hidden behind a real object when expressing the occlusion is cut out in an elliptical shape to perform occlusion processing has been known (see, for example, Patent Document 1).

RELATED ART DOCUMENTS

Patent Documents

Patent Document 1: US Patent Application Publication No. 2012/206452

SUMMARY OF THE INVENTION

Problems to be Solved by the Invention

In the occlusion processing described above, for example, in the case of single vision that displays the AR on a smartphone or tablet, it is only necessary to simply express the occlusion in accordance with the distance relationship between the real object and the CG image.

However, in the case of a head mounted display apparatus using binocular vision such as AR glasses, in order to faithfully express the occlusion in AR display, the parallax and convergence angle of both eyes need to be taken into consideration, and there is a problem that the AR image becomes unnatural if only the occlusion processing for single vision is simply applied.

Further, in the processing technology for the occlusion in Patent Document 1 described above, since the processing in which the difference in vision due to the binocular parallax, convergence angle, and the like of the user is taken into consideration is not performed and the CG image region is cut out in an elliptical shape instead of cutting out the CG image region hidden behind the real object along the outline of the real object, there is a problem that the display in the border between the real object and the CG image becomes unnatural.

An object of the present invention is to provide a technology capable of faithfully expressing the occlusion even in the binocular vision in the AR display by a head mounted display apparatus or the like.

The above and other objects and novel features of the present invention will become apparent from the description of this specification and the accompanying drawings.

Means for Solving the Problems

The outline of the typical invention disclosed in this application will be briefly described as follows.

Namely, a typical head mounted display apparatus includes a first lens, a second lens, a first camera, a second camera, and an information processor. The first lens displays a CG image for a right eye. The second lens displays a CG image for a left eye. The first camera captures an image for the right eye. The second camera captures an image for the left eye.

The information processor generates the CG image for the right eye in which occlusion at the time of seeing by the right eye is expressed and the CG image for the left eye in which occlusion at the time of seeing by the left eye is expressed, based on the images captured by the first camera and the second camera, projects the generated CG image for the right eye onto the first lens, and projects the generated CG image for the left eye onto the second lens.

Further, a center of a lens of the first camera is provided at the same position as a center of the first lens (center of a pupil of a wearer). A center of a lens of the second camera is provided at the same position as a center of the second lens (center of a pupil of a wearer).

In particular, the information processor includes a first information generator, a second information generator, a first shielded region calculator, a second shielded region calculator, an image generator, and a display unit.

The first information generator generates occlusion information indicating a shielding relationship between the CG image to be displayed on the first lens and a real environment based on the images captured by the first camera and the second camera. The second information generator generates occlusion information indicating a shielding relationship between the CG image to be displayed on the second lens and the real environment based on the images captured by the first camera and the second camera.

The first shielded region calculator calculates a shielded region in which the CG image displayed on the first lens is shielded by an object when the CG image is seen by the right eye, based on the occlusion information generated by the first information generator. The second shielded region calculator calculates a shielded region in which the CG image displayed on the second lens is shielded by the object when the CG image is seen by the left eye, based on the occlusion information generated by the second information generator.

The image generator generates the CG image for the right eye in which the shielded region calculated by the first shielded region calculator is not displayed and the CG image for the left eye in which the shielded region calculated by the second shielded region calculator is not displayed, based on CG image generation data for generating the CG image. The display unit projects the CG image for the right eye and the CG image for the left eye generated by the image generator onto the first lens and the second lens, respectively.

Effects of the Invention

The effect obtained by the typical invention disclosed in this application will be briefly described as follows.

It is possible to faithfully express the occlusion in the AR display of the binocular vision.

DETAILED DESCRIPTION OF PREFERRED EMBODIMENT

The same members are denoted by the same reference signs in principle throughout the drawings for describing the embodiment, and the repetitive description thereof will be omitted.

The embodiment will be described in detail below.

<Configuration Example of Head Mounted Display Apparatus>

Figure 1:
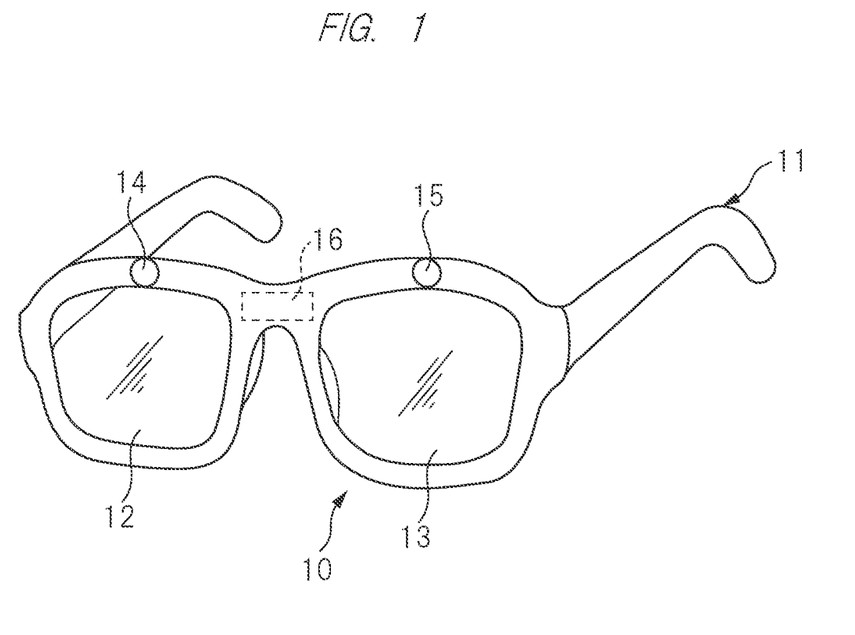
FIG. 1 is an explanatory diagram showing an example of the configuration in a head mounted display apparatus according to an embodiment.

FIG. 1 is an explanatory diagram showing an example of the configuration in a head mounted display apparatus 10 according to the embodiment.

As shown in FIG. 1, the head mounted display apparatus 10 includes a chassis 11, lenses 12, 13, cameras 14, 15, and a control processor 16. The chassis 11 constitutes a spectacle frame.

The lens 12 which is the first lens and the lens 13 which is the second lens are each fixed to a rim of the chassis 11. The lenses 12 and 13 fixed to the rim are provided so as to respectively correspond to the left and right eyes of the user who uses the head mounted display apparatus 10.

The camera 14 which is the first camera is provided on the upper part of the rim which fixes the lens 12, and the camera 15 which is the second camera is provided on the upper part of the rim which fixes the lens 13. These cameras 14 and 15 are, for example, stereo cameras. The stereo cameras capture an object by using the parallax of two camera.

The camera 14 is a camera corresponding to the right eye of the user, and the camera 15 is a camera corresponding to the left eye of the user. These cameras 14 and 15 take images, respectively.

Also, the center of the lens of the camera 14 is provided at a position substantially the same as the center of the lens 12. In other words, the center of the lens of the camera 14 is substantially the same as the center of the pupil of the right eye of the user.

Similarly, the center of the lens of the camera 15 is provided at a position substantially the same as the center of the lens 13. In other words, the center of the lens of the camera 15 is substantially the same as the center of the pupil of the right eye of the user.

Figure 2:
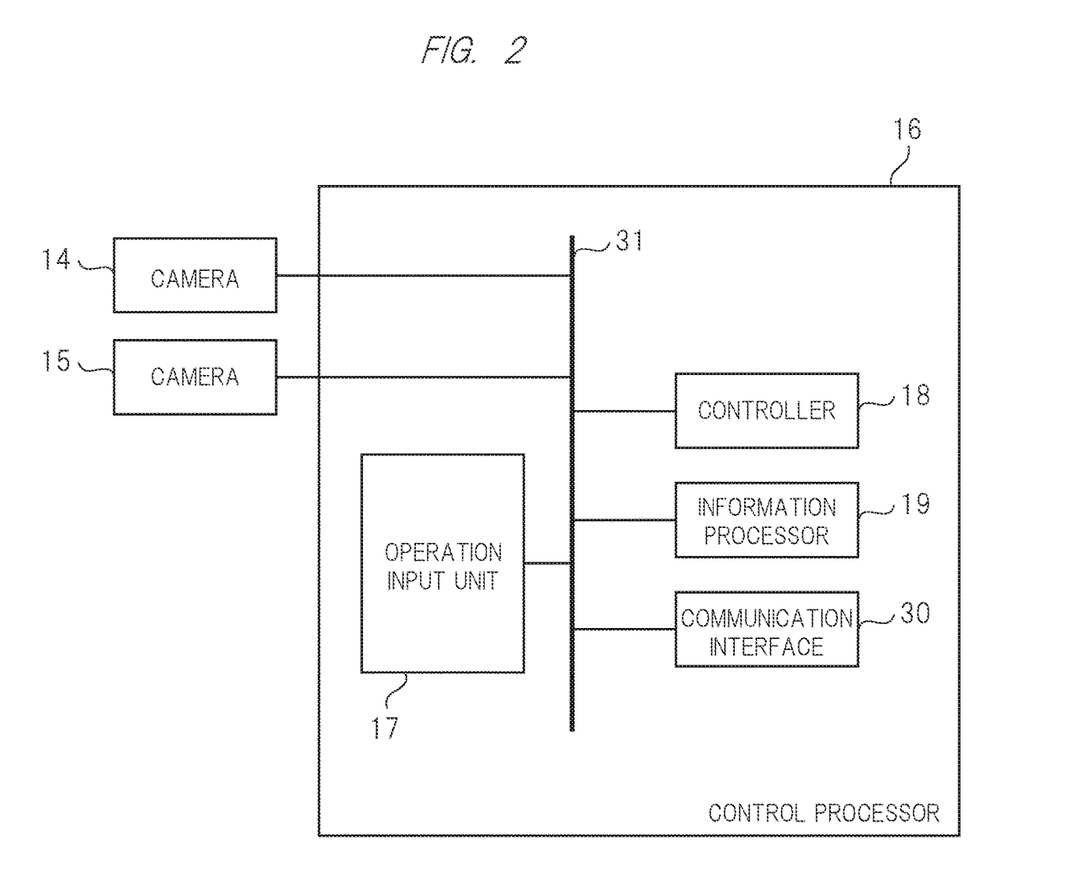
FIG. 2 is an explanatory diagram showing an example of the configuration of a control processor in the head mounted display apparatus in FIG. 1.

FIG. 2 is an explanatory diagram showing an example of the configuration of the control processor 16 in the head mounted display apparatus 10 in FIG. 1.

As shown in FIG. 2, the control processor 16 includes an operation input unit 17, a controller 18, an information processor 19, and a communication interface 30. The operation input unit 17, the controller 18, the information processor 19, the communication interface 30, and the cameras 14 and 15 in FIG. 1 are connected to each other by a bus 31.

The operation input unit 17 is a user interface including, for example, a touch sensor. The touch sensor is composed of, for example, a capacitive touch panel that electrostatically detects the position of a user's finger or the like in contact with the touch sensor.

The controller 18 is responsible for the control in the head mounted display apparatus 10. The information processor 19 generates a CG image and displays it on the lenses 12 and 13. The information processor 19 is provided in, for example, a bridge portion of the chassis 11. The arrangement of the information processor 16 is not particularly limited, and the information processor 16 may be provided in, for example, a temple portion of the chassis 11.

The CG image generated by the information processor 16 is projected onto the lenses 12 and 13. The projected CG images are magnified and displayed by the lenses 12 and 13, respectively. Then, the CG images displayed on the lenses 12 and 13 are superimposed on the real image to form an AR image.

The communication interface 30 performs wireless communication of the information or the like by, for example, Bluetooth (registered trademark) or an Internet line.

<Configuration Example of Information Processor>

Figure 3:
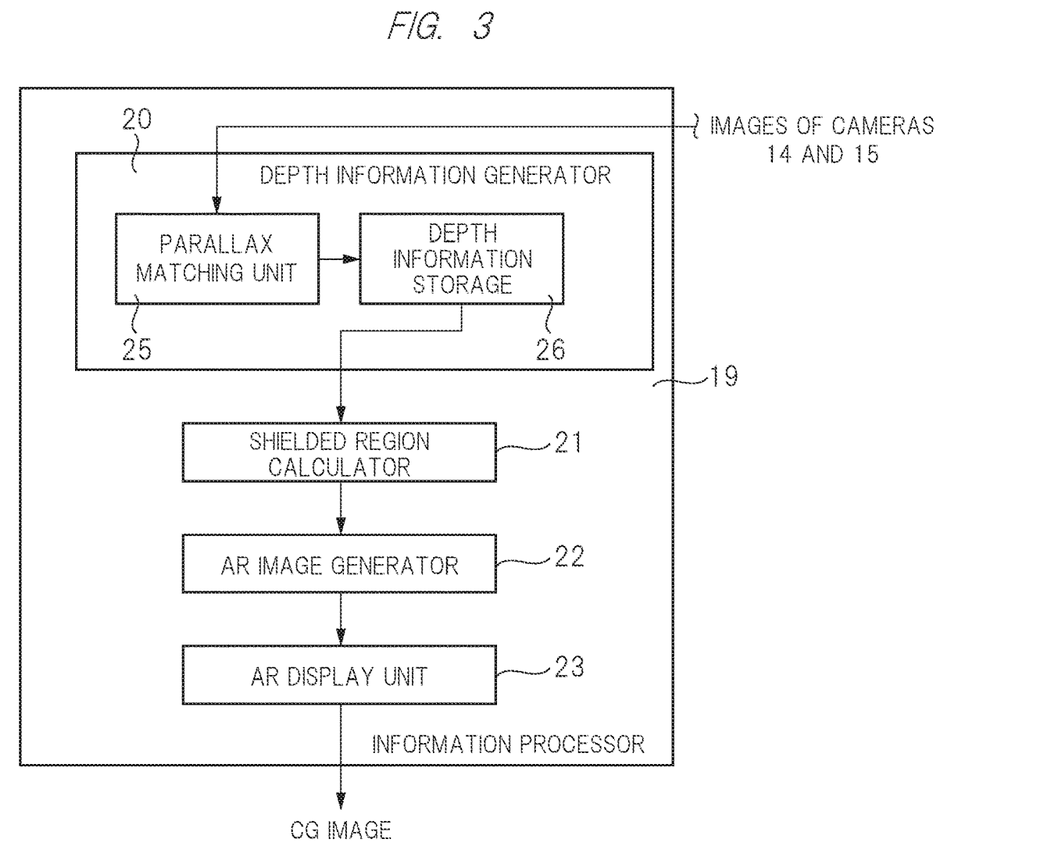
FIG. 3 is an explanatory diagram showing an example of the configuration of an information processor in the control processor in FIG. 2.

FIG. 3 is an explanatory diagram showing an example of the configuration of the information processor 19 in the control processor 16 in FIG. 2.

As shown in FIG. 3, the information processor 19 includes a depth information generator 20, a shielded region calculator 21, an AR image generator 22, and an AR display unit 23.

The depth information generator 20 that constitutes a first information generator and a second information generator calculates and stores the distance to the object, the convergence angle, and the like. The depth information generator 20 includes a parallax matching unit 25 and a depth information storage 26.

The parallax matching unit 25 calculates the object distance and the convergence angle of all the objects in the images taken by the cameras 14 and 15 in FIG. 1. The images taken by the cameras 14 and 15 are input via the bus 31.

The object distance is the distance from the cameras 14 and 15 to the object, in other words, the depth information of the object. The convergence angle is an angle formed by the sight lines from both eyes at the object to be seen. This convergence angle can be calculated from, for example, the object distance and the position information of the object on the image.

The depth information storage 26 is composed of a semiconductor memory exemplified by, for example, a flash memory, and stores depth information for a right eye (right-eye depth information) and depth information for a left eye (left-eye depth information). The right-eye depth information is the information obtained by adding the object distance and the convergence angle calculated by the parallax matching unit 25 to the image taken by the camera 14. The left-eye depth information is the information obtained by adding the object distance and the convergence angle calculated by the parallax matching unit 25 to the image taken by the camera 15.

The shielded region calculator 21 that constitutes a first shielded region calculator and a second shielded region calculator calculates a shielded region of the CG image for a right eye (right-eye CG image) and a shielded region of the CG image for a left eye (left-eye CG image) based on the right-eye depth information and the left-eye depth information stored in the depth information storage 26 and the distance information of the CG image to be displayed. The shielded region is the region in which a part of the CG image is not displayed in order to express the occlusion.

The AR image generator 22 which is an image generator generates the right-eye CG image and the left-eye CG image based on the shielded region of the right-eye CG image and the shielded region of the left-eye CG image calculated by the shielded region calculator 21 and the image generation data.

The distance information of the CG image described above is the information indicating the distance and position of the CG image to be displayed. The image generation data is the data necessary for generating the CG image to be displayed, for example, data such as the shape and color scheme of the CG image.

The distance information and image generation data are provided by, for example, an application input from the outside. The application is acquired through, for example, the communication interface 30 in the control processor 16. Alternatively, it is also possible to provide a memory (not shown) in the information processor 19 and store the application input from the outside in the memory in advance.

The AR display unit 23 which is the display is an optical system that projects and draws the right-eye CG image and the left-eye CG image generated by the AR image generator 22 on the lenses 12 and 13, respectively.

<Operation Example of Head Mounted Display Apparatus>

Next, the operation of the head mounted display apparatus 10 will be described.

First, the cameras 14 and 15 take images. The images taken by the cameras 14 and 15 are input to the parallax matching unit 25 in the depth information generator 20. The parallax matching unit 25 calculates the object distance and the convergence angle from the images taken by the cameras 14 and 15.

The object distance is obtained by calculating the difference in position between the images taken by the cameras 14 and 15 by means of triangulation or the like by the parallax matching unit 25. Alternatively, instead of calculating the distance to the object based on the images of the cameras 14 and 15 constituting the stereo camera, for example, it is also possible to newly provide a distance sensor (not shown) or the like in the information processor 19, and measure the distance to the object by the distance sensor.

The convergence angle is calculated by the parallax matching unit 25 based on the calculated object distance and the position of the object. These calculations are performed for each object in the images taken by the cameras 14 and 15.

Thereafter, the parallax matching unit 25 adds the object distance and the convergence angle calculated from the image of the camera 14 to the image taken by the camera 14. Similarly, the parallax matching unit 25 adds the object distance and the convergence angle calculated from the image of the camera 15 to the image taken by the camera 15.

Then, the parallax matching unit 25 stores the image of the camera 14 to which the distance and the convergence angle have been added in the depth information storage 26 as the right-eye depth information described above, and stores the image of the camera 15 to which the distance and the convergence angle have been added in the depth information storage 26 as the left-eye depth information described above.

The shielded region calculator 21 acquires the distance to the object and the convergence angle from the right-eye depth information and the left-eye depth information stored in the depth information storage 26. Thereafter, based on the acquired distance to the object, the convergence angle, and the distance information of the CG image provided from the application, the shielded region calculator 21 calculates the region where the CG image displayed for the right eye is shielded by the real object and the region where the CG image displayed for the left eye is shielded by the real object.

The information of the shielded region calculated by the shielded region calculator 21 is output to the AR image generator 22. The AR image generator 22 generates the CG image to be superimposed on a real scene, based on the image generation data provided from the application.

At that time, the AR image generator 22 generates the CG image in which the region expressing the occlusion is not displayed, based on the information of the shield region calculated by the shielded region calculator 21.

The right-eye CG image and the left-eye CG image generated by the AR image generator 22 are output to the AR display unit 23. The AR display unit 23 projects the input right-eye CG image onto the lens 12 and the input left-eye CG onto the lens 13, respectively.

Consequently, the right-eye CG image in which the occlusion optimum for the field of view of the right eye is expressed and the left-eye CG image in which the occlusion optimum for the field of view of the left eye is expressed are displayed on the lenses 12 and 13, respectively. As a result, it is possible to provide the AR image in which faithful occlusion is expressed.

<Display of CG Image in Consideration of Binocular Vision>

Figure 4:
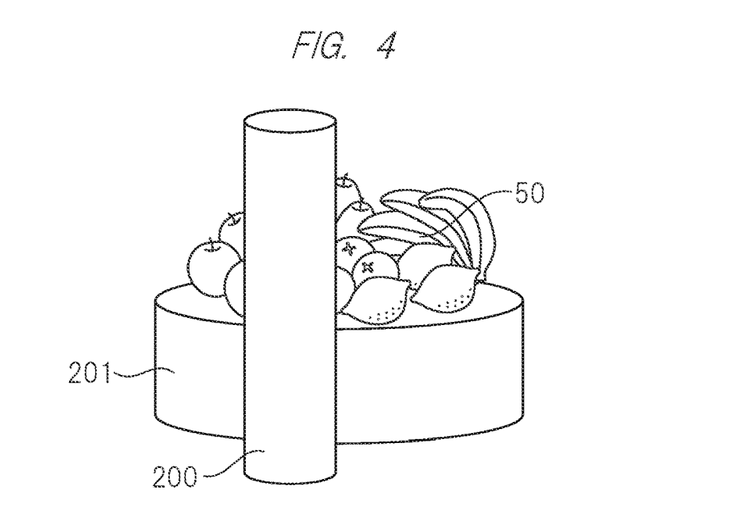
FIG. 4 is an explanatory diagram showing an example of an AR display by the head mounted display apparatus in FIG. 1.
Figure 5:
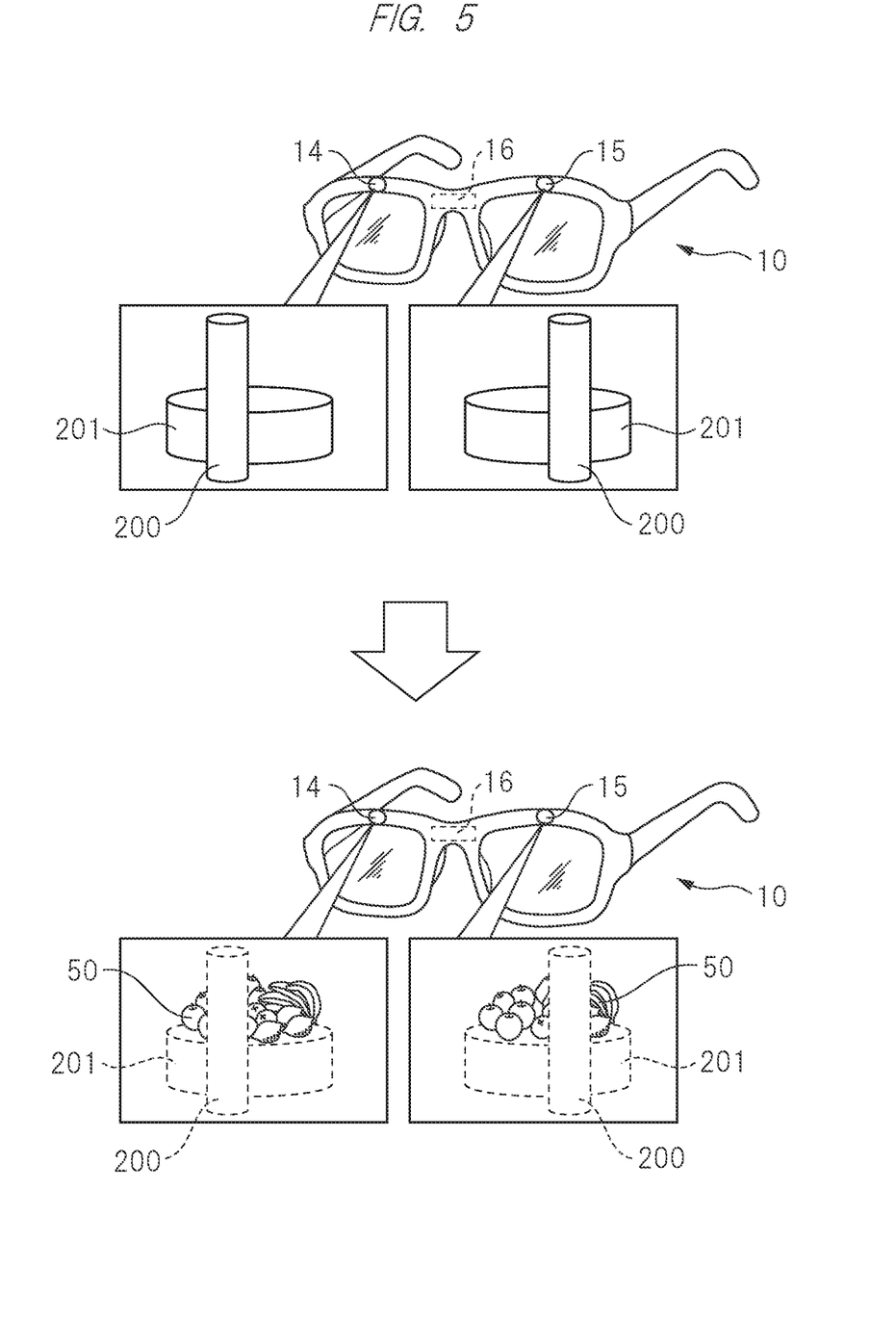
FIG. 5 is an explanatory diagram showing an example of image processing in which the binocular vision is taken into consideration.
Figure 6:
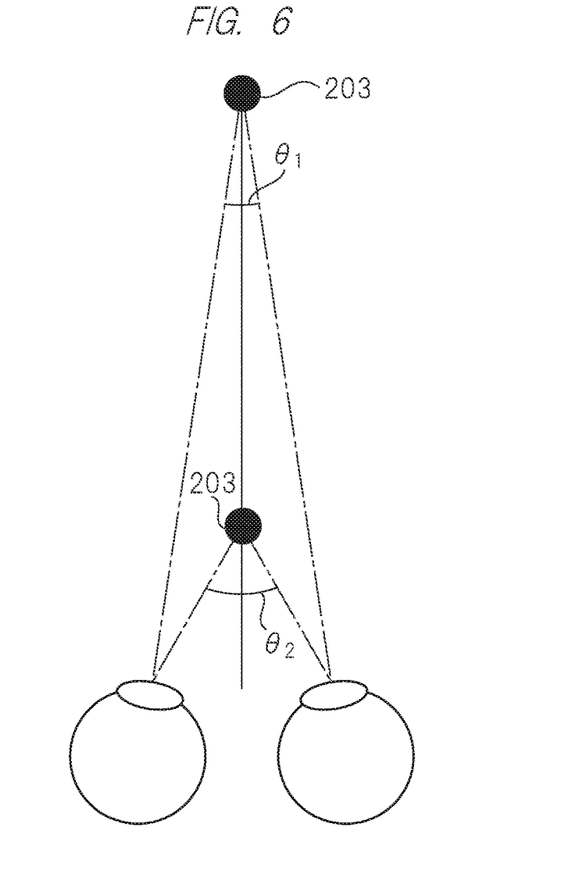
FIG. 6 is an explanatory diagram showing an example of the convergence angle.
Figure 7:
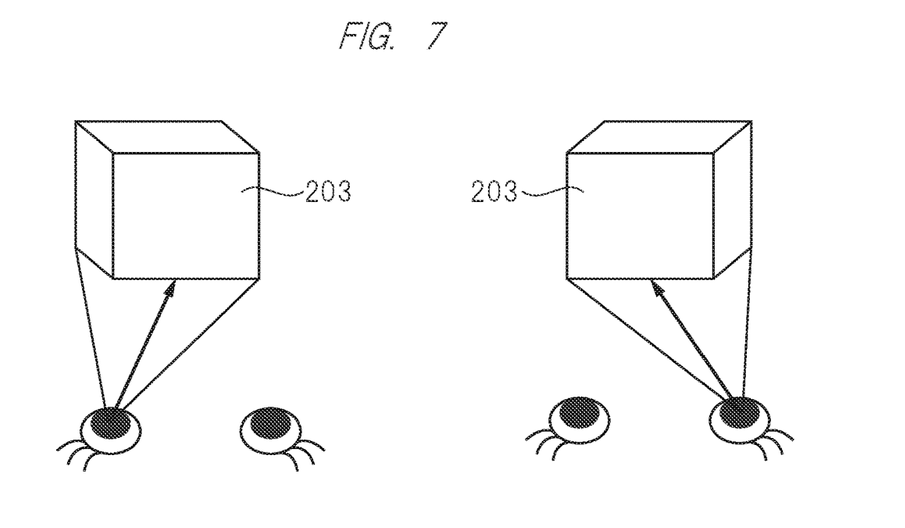
FIG. 7 is an explanatory diagram showing an example of the difference in vision between the right eye and the left eye.

FIG. 4 is an explanatory diagram showing an example of an AR display by the head mounted display apparatus 10 in FIG. 1. FIG. 5 is an explanatory diagram showing an example of image processing in which the binocular vision is taken into consideration. FIG. 6 is an explanatory diagram showing an example of the convergence angle. FIG. 7 is an explanatory diagram showing an example of the difference in vision between the right eye and the left eye.

FIG. 4 shows an example of the AR display in the state where there is a real object 201 behind a real object 200 and a CG image 50 is placed on the real object 201.

The right eye and the left eye of the human are separated by about 6 cm, and thus the sceneries captured by the left and right eyes are slightly different from each other. At this time, the amount of deviation differs depending on the distance of the object. Therefore, when performing the AR display in consideration of binocular vision, it is necessary to grasp the visions of the real object captured by the left and right eyes of the user.

Further, as shown in FIG. 6, with respect to the convergence angle, the convergence angle θ2 when an object 203 at a close position is seen is larger than the convergence angle θ1 when the object 203 at a distant position is seen. As shown in FIG. 7, as the convergence angle changes, the region of the object 203 that each of the right eye and the left eye sees also changes, and thus the change of the shielded region of the CG image caused by the difference in the visible region due to the convergence angle also needs to be taken into consideration.

Thus, as described above, the images are taken by the camera 14 provided such that the center of the lens is substantially the same as the center of the user's right eye and the camera 15 provided such that the center of the lens is substantially the same as the center of the user's left eye. Consequently, it is possible to capture the images that are almost the same as the visions of the real object by the left and right eyes of the user.

As described above, when the user sees the real objects 200 and 201 in FIG. 4, the way of hiding the real object 201 differs depending on the left and right eyes. Therefore, the cameras 14 and 15 capture the real objects 200 and 201 in FIG. 4 such that the images substantially similar to the images captured by the left and right eyes are acquired.

For example, when the right eye of the human captures the real objects 200 and 201 in FIG. 4, the real object 201 is seen such that the left side of the real object 201 is mainly hidden by the real object 200. When the left eye captures it, the real object 201 is seen such that the right side of the real object 201 is mainly hidden by the real object 200.

The images taken by the cameras 14 and 15 are also the same as the images captured by the left and right eyes of the human, and as shown in the upper part of FIG. 5, the left side of the real object 201 is mainly hidden by the real object 200 in the image captured by the camera 14 for the right eye, and the right side of the real object 201 is mainly hidden by the real object 200 in the image captured by the camera 15 for the left eye.

Then, as shown in the lower part of FIG. 5, the shielded region of the CG image 50 to be superimposed is calculated from the image acquired by the camera 14 and the shielded region of the CG image 50 to be superimposed is calculated from the image captured by the camera 15, and the right-eye CG image and the left-eye CG image are individually generated and displayed.

In this way, by respectively generating and displaying the right-eye CG image and the left-eye CG image in consideration of the shielding relationship in the left and right visual fields, the user can view the AR image in which the faithful occlusion is expressed.

As described above, it is possible to provide a natural AR image that does not give a sense of discomfort to the user.

<Another Example of CG Image Generation>

Further, the CG images may be displayed on the lenses 12 and 13 after the resolution, in other words, the blur amount of the CG image is adjusted in accordance with the distance information of the CG image provided from the application. This makes it possible to display a more natural CG image.

In this case, the depth information storage 26 stores the blur amount information including the distance of the CG image and the blur amount associated with the distance. The AR image generator 22 acquires the distance of the CG image based on the distance information of the CG image provided from the application. Then, the AR image generator 22 searches for the blur amount information stored in the depth information storage 26, and extracts the blur amount that matches or is close to the blur amount corresponding to the acquired distance.

Thereafter, the AR image generator 22 performs the blurring process to the CG image based on the extracted blur amount. The blur information indicates, for example, the degree of blur of the outline of the CG image, and the process of blurring the outline of the CG image is performed based on the blur information.

In this manner, since the CG image can be blurred in the same way as in the distant view, the sense of discomfort such as the CG image being clearly displayed even though it is a CG image displayed at the distance can be eliminated, so that a more natural AR image can be provided to the user.

Further, by generating the CG image using the blur amount information in which the size of the CG image and the like are taken into consideration instead of determining the blur amount using only the distance information of the CG image, it is possible to provide an AR image having a natural blur that fits in a distant view as compared with the case of using only the distance information.

In this case, the blur amount information is the information having the display distance and size of the CG image and the blur amount associated with the distance and size of the CG image. The AR image generator 22 acquires the distance of the CG image based on the distance information of the CG image provided from the application, and similarly acquires the size information of the CG image based on the image generation data of the CG image provided from the application.

Then, the AR image generator 22 searches for the blur amount information stored in the depth information storage 26, and extracts the blur amount that matches or is close to the blur amount corresponding to the acquired distance and size. Then, based on the extracted blur information, the AR image generator 22 performs a process of blending the outline of the CG image.

In the foregoing, the present invention has been specifically described based the embodiment, but it is needless to say that the present invention is not limited to the embodiment described above and can be variously modified within the range not departing from the gist thereof.

REFERENCE SIGNS LIST 10 head mounted display apparatus
11 chassis
12 lens
13 lens
14 camera
15 camera
16 control processor
17 operation input unit
18 controller
19 information processor
19 information processor
20 information generator
21 shielded region calculator
22 AR image generator
23 AR display unit
25 parallax matching unit
26 depth information storage
30 communication interface
50 CG image

The invention claimed is:

1. A head mounted display apparatus comprising:
a first lens configured to display a CG image for a right eye;
a second lens configured to display a CG image for a left eye;
a first camera configured to capture an image for the right eye;
a second camera configured to capture an image for the left eye;
an information processor configured to generate the CG image for the right eye in which occlusion at a time of seeing by the right eye is expressed and the CG image for the left eye in which occlusion at a time of seeing by the left eye is expressed, based on the images captured by the first camera and the second camera, project the generated CG image for the right eye onto the first lens, and project the generated CG image for the left eye onto the second lens; and
a communication interface configured to acquire an application which provides image generation data used for generation of the CG image,
wherein the information processor includes:
a first information generator configured to generate occlusion information indicating a shielding relationship between the CG image to be displayed on the first lens and a real environment based on the images captured by the first camera and the second camera;
a second information generator configured to generate occlusion information indicating a shielding relationship between the CG image to be displayed on the second lens and the real environment based on the images captured by the first camera and the second camera;
a first shielded region calculator configured to calculate a shielded region in which the CG image displayed on the first lens is shielded by an object when the CG image is seen by the right eye, based on the occlusion information generated by the first information generator;
a second shielded region calculator configured to calculate a shielded region in which the CG image displayed on the second lens is shielded by the object when the CG image is seen by the left eye, based on the occlusion information generated by the second information generator;
an image generator configured to generate the CG image for the right eye in which the shielded region calculated by the first shielded region calculator is not displayed and the CG image for the left eye in which the shielded region calculated by the second shielded region calculator is not displayed, based on the CG image generation data provided from the application; and
a display configured to project the CG image for the right eye and the CG image for the left eye generated by the image generator onto the first lens and the second lens, respectively,
wherein the occlusion information generated by the first information generator and the second information generator includes a blur amount set in accordance with distance information provided from the application, and
wherein the image generator performs a process of blurring an outline of the CG image for the right eye in which the shielded region is not displayed and an outline of the CG image for the left eye in which the shielded region is not displayed, based on the blur amount acquired from the occlusion information.

2. The head mounted display apparatus according to claim 1,
wherein the image generation data is data indicating a shape, color or size of the CG image.

3. The head mounted display apparatus according to claim 1,
wherein the occlusion information generated by the first information generator and the second information generator includes an object distance indicating a distance from the first camera and the second camera to the object and a convergence angle which is an angle at which sight lines from both eyes intersect at the object when the object is seen by both eyes.

4. The head mounted display apparatus according to claim 3,
wherein the image generator calculates the shielded regions for the CG image for the right eye and the CG image for the left eye based on the object distance and the convergence angle included in the occlusion information.

5. The head mounted display apparatus according to claim 1,
wherein a center of a lens of the first camera is provided at the same position as a center of the first lens, and
wherein a center of a lens of the second camera is provided at the same position as a center of the second lens.

* * * * *